United States Patent
Polak

(10) Patent No.: US 8,597,791 B2
(45) Date of Patent: Dec. 3, 2013

(54) SENSOR OF AN APPARATUS FOR DETERMINING AND/OR MONITORING A PROCESS VARIABLE

(75) Inventor: Jiri Polak, Neu St. Johann (CH)

(73) Assignee: Innovative Sensor Technology IST AG, Wattwil (CH)

( * ) Notice: Subject to any disclaimer, the term of this patent is extended or adjusted under 35 U.S.C. 154(b) by 507 days.

(21) Appl. No.: 12/452,948

(22) PCT Filed: Jul. 10, 2008

(86) PCT No.: PCT/EP2008/058964
§ 371 (c)(1),
(2), (4) Date: Apr. 26, 2010

(87) PCT Pub. No.: WO2009/016013
PCT Pub. Date: Feb. 5, 2009

(65) Prior Publication Data
US 2011/0189491 A1      Aug. 4, 2011

(30) Foreign Application Priority Data
Jul. 30, 2007   (DE) .................. 10 2007 035 997

(51) Int. Cl.
*B32B 17/06*   (2006.01)
*B32B 15/04*   (2006.01)

(52) U.S. Cl.
USPC ........... 428/434; 428/471; 428/697; 428/699; 428/701; 428/702

(58) Field of Classification Search
None
See application file for complete search history.

(56) References Cited

U.S. PATENT DOCUMENTS

| | | | |
|---|---|---|---|
| 5,202,665 A | 4/1993 | Hafele | |
| 5,300,916 A * | 4/1994 | Ishiguro et al. | 338/25 |
| 5,430,428 A * | 7/1995 | Gerblinger et al. | 338/25 |
| 5,610,572 A * | 3/1997 | Yajima | 338/22 R |
| 6,096,181 A * | 8/2000 | Friese et al. | 204/424 |
| 6,387,318 B1 * | 5/2002 | Xue et al. | 264/642 |
| 6,437,681 B1 | 8/2002 | Wang | |
| 6,617,956 B1 * | 9/2003 | Zitzmann | 338/25 |
| 2003/0006876 A1 * | 1/2003 | Geier et al. | 338/25 |

FOREIGN PATENT DOCUMENTS

| | | |
|---|---|---|
| DE | 275 311 | 1/1990 |
| DE | 43 00 084 | 7/1994 |
| DE | 44 45 243 | 6/1995 |
| DE | 195 40 194 | 2/1997 |
| DE | 199 18 003 | 1/2000 |
| DE | 199 01 183 | 8/2000 |
| DE | 199 01 184 | 10/2000 |
| EP | 0 905 434 | 3/1999 |
| EP | 0 905 494 | 3/1999 |
| EP | 1 431 718 | 6/2004 |
| WO | WO 92/15101 | 9/1992 |

OTHER PUBLICATIONS

Hafner et al. (1958), "Optical and Physical Properties of Some Calcium Aluminate Glasses," Journal of the American Ceramic Society, 41: 315-323.*

* cited by examiner

*Primary Examiner* — David Sample
(74) *Attorney, Agent, or Firm* — Bacon & Thomas, PLLC

(57) ABSTRACT

A sensor of an apparatus for determining and/or monitoring at least one process variable. The sensor includes: at least one substrate, which is composed of a substrate material; at least one sensitive layer, which is applied on the substrate and which produces at least one measured variable dependent on the process variable and/or on a change of the process variable; and at least one passivating layer, which is applied on the sensitive layer. The invention provides that the passivating layer consists at least partially of the substrate material.

16 Claims, 1 Drawing Sheet

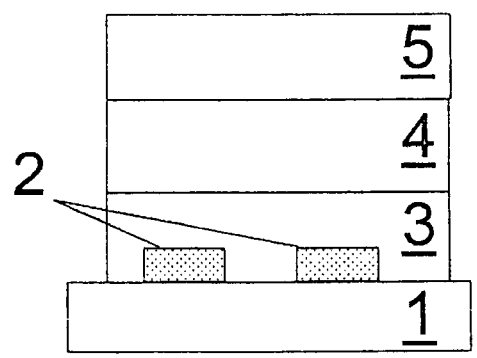

SENSOR OF AN APPARATUS FOR DETERMINING AND/OR MONITORING A PROCESS VARIABLE

TECHNICAL FIELD

The invention relates to a sensor of an apparatus for determining and/or monitoring at least one process variable. The sensor includes: at least one substrate, which is composed of a substrate material; at least one sensitive layer, which is applied on the substrate and which produces at least one measured variable dependent on the process variable and/or on a change of the process variable; and at least one passivating layer, which is applied on the sensitive layer. The process variable is, for example, temperature or flow of a medium.

BACKGROUND DISCUSSION

In the state of the art, it is known, for example, to determine, or to monitor, temperature via evaluation of the electrical resistance of a resistance element. The resistance elements are, in such case, for example, applied on a substrate via thin film techniques or thick film techniques. In order to prevent corrosion, mechanical damage or the loss of part of the active/sensitive layer, e.g. through evaporation, most often, a coating in the form a passivating layer is applied. The layer correspondingly sensitive for the measuring and the substrate and other layers then together form the actual measuring sensor.

Problematic is the fact that, in the field of temperature measuring technology, more and more, applicability for higher temperatures up to 1000° C. and beyond is required. Examples of such applications are thermal treatment processes in conventional ovens or furnaces and temperature measurements in automobile engines. The sensor must, in such case, withstand extreme conditions. Since the layers have, in given cases, different coefficients of thermal expansion, high temperatures produce mechanical stresses in the layers, which can e.g. bring about cracks in the individual layers. This can lead to complete failure, or the resistance value, or temperature coefficient (TCR-value), of the sensor element becomes significantly altered.

SUMMARY OF THE INVENTION

An object of the invention is to provide a sensor that can be used at high temperatures.

This object is achieved according to the invention by composing the passivating layer at least partially of substrate material. By this coordination of the materials with one another, a matching of the coefficients of thermal expansion is achieved.

In an example, the substrate is a ceramic, such as e.g. $Al_2O_3$, on which, for example, platinum, or, at least partially, platinum, is applied as sensitive layer. In order to lessen mechanical stress between the layers, and in order, also, to guard against the danger of damage to the active sensor meander, a passivating layer is applied.

In an embodiment, the material of the passivating layer is identical with that of the substrate, i.e. the passivating layer consists essentially completely of substrate material.

In some embodiments, it can occur, that the substrate material has such a thermal treatment temperature, by which the material of the passivating layer is converted into a compact glass melt, that the already existing structure of substrate and sensitive layer should not be exposed to this temperature for producing the passivating layer from the substrate material, since such could otherwise bring about changes, or damaging, of the sensitive layer, or even the substrate. In the case of a layer of $Al_2O_3$, for instance, production of a passivating film of such material requires, for example, a temperature greater than 1600° C. Therefore, it is, in some embodiments, advantageous, when the passivation is composed only partially of the substrate material.

The passivation serves, among other things, for mechanical protection, or protection against chemical influences. Furthermore, the passivating layer protects against evaporation of the sensitive layer, i.e. the layer active for the measuring.

Advantageously, the passivation involves a sealingly closed "glass".

An embodiment of the invention provides that the passivating layer contains at least about 10% of the substrate material. Percentages herein are on a weight basis.

An embodiment of the invention provides that the passivating layer contains about 40% of the substrate material.

An embodiment of the invention includes that the passivating layer contains between about 10% and about 90% of the substrate material. In an embodiment, the passivating layer contains between 40% and 90% of the substrate material.

An embodiment includes that the passivating layer is essentially a eutectic glass system. The passivating layer has, thus, a glass-like structure and is eutectic in this embodiment.

An embodiment provides that the passivating layer has a melting temperature between about 1200° C. and about 1500° C.

An embodiment includes that the passivating layer has a melting temperature between about 1200° C. and about 1400° C. I.e., the composition of the passivating layer is produced in such a manner, that the melting temperature lies between the stated limits.

An embodiment of the invention provides that the substrate consists essentially of $Al_2O_3$.

An embodiment of the invention includes that the passivating layer consists at least partially of a glass and/or a glass system.

An embodiment is such that the passivating layer consists at least partially of alpha-$Al_2O_3$.

An embodiment of the invention provides that the passivating layer consists at least partially of a glass and/or a melt of a system, $Al_2O_3$—CaO—SrO.

An embodiment of the invention includes that the passivating layer consists at least partially of a glass and/or a melt of a system, $Al_2O_3$—CaO—BaO.

An embodiment of the invention includes that the passivating layer is at least about 10% $Al_2O_3$ and at least about 10% CaO.

An embodiment of the invention provides that the passivating layer is composed of about equal percentages of $Al_2O_3$ and CaO. In this embodiment, the passivating layer is composed thus essentially of an $Al_2O_3$ percentage and an equal amount of CaO, wherein also other substances can be present in the layer.

An embodiment of the invention includes that the passivating layer contains more $Al_2O_3$ than CaO. The amount of $Al_2O_3$ can, in such case, also be only slightly larger.

An embodiment of the invention provides that the passivating layer contains between about 30% and 50% $Al_2O_3$, and between about 30% and 50% CaO.

An embodiment of the invention includes that the passivating layer contains about 40% $Al_2O_3$ and about 40% CaO.

An embodiment of the invention includes that the passivating layer consists at least partially of $SiO_2$, CaO, BaO, $Al_2O_3$ or MgO.

Above the sensitive layer and, thus, on the side of the sensitive layer facing away from the substrate is located, thus, at least a (first) passivation, which, in an embodiment, is composed of a mixture of alpha-$Al_2O_3$ at between and 90% and a glass and/or a melt of a system of e.g. $Al_2O_3$—CaO—SrO or $Al_2O_3$—CaO—BaO.

Through the high content of substrate material—in this example, $Al_2O_3$—in the mixture, a matching of the coefficients of expansion is achieved. By adding an above-mentioned glass, or melt, at the same time, the thermal treatment temperature is reduced, in this example of substrate material, to a temperature between about 1200° C. and 1500° C. Following the thermal treatment, such a layer is temperature resistant.

An embodiment of the invention provides that at least a second passivating layer is provided, which is applied on the first passivating layer. In the case of the application of a second passivating layer, thus, the initially discussed passivating layer is also referred to as the first passivating layer.

An embodiment of the invention includes that the first passivating layer and the second passivating layer are composed essentially of the same material. I.e., the first and the second passivating layers have essentially the same composition.

An embodiment of the invention provides that the second passivating layer is essentially a glass system.

An embodiment of the invention includes that the glass system of the second passivating layer is based on $SiO_2$, CaO, BaO, $Al_2O_3$ or MgO.

The inadequacies in the case of some methods for applying the passivating layer are, thus, compensated by the feature that a second passivating layer is applied above the (first) passivating layer. The passivation is applied, for example, with screen printing techniques, so that one must reckon in the case of the first layer with process-related "holes". Therefore, the first passivating step is repeated, in order to apply a second passivating layer.

For the protection of the sensitive layer, such as e.g. the platinum meander on the substrate, it is critical that no crack or hole is present in the passivation. At a hole, the material (e.g. the platinum) of the sensitive layer vaporizes, whereby a hole in the structure, e.g. the meander, of the active/sensitive layer results. Therewith rises the electrical resistance, or even a complete interruption of the circuit can occur.

An embodiment of the invention provides that at least one protective layer is provided, which is applied on the first passivating layer and/or on the second passivating layer.

An embodiment of the invention includes that the protective layer is embodied in such a manner that it is water resistant and/or water vapor, or steam, resistant. The protective layer is, thus, a water, or water vapor, or steam, protective layer. In an additional embodiment, the protective layer is also acid resistant.

An embodiment provides that the protective layer is composed of a glass and/or a glass system based on $SiO_2$, CaO, BaO, $Al_2O_3$ or MgO. Especially preferable is, here, an $SiO_2$ and CaO, glass system, to which low amounts of $Al_2O_3$ are added. The latter serves for matching the coefficients of thermal expansion to the glass system lying therebeneath.

The first passivating layer and, respectively, the second passivating layer are, indeed, temperature resistant after the heat treatment, however, as a result of the composition, not water, or water vapor, or steam, resistant. Therefore, the protective layer is required, which is water resistant and which preferably is composed of a glass system based on $SiO_2$, CaO, BaO, $Al_2O_3$ or MgO.

If, in total, two passivating layers are provided, which are to equalize mechanical stresses due to different coefficients of thermal expansion, and an additional, protective layer is provided, which prevents, that water, or steam reaches the passivating layer lying under the protective layer, then the passivation is composed, in total, of three layers. Or, in other words: The passivation is produced by the application of three layers, in order to achieve the desired properties.

The protection against water, water vapor or steam is required, since such an above discussed, high temperature passivation is not, respectively, water and acid resistant. The water decomposes the matrix of the glass system until it crumbles.

An embodiment of the invention provides that the process variable is temperature. The measuring of the temperature serves, for example, also for measuring the flow of a medium, in that the cooling of a heating element by the flowing medium is evaluated.

An embodiment of the invention includes that the sensitive layer is composed at least partially of platinum.

An embodiment of the invention provides that the sensitive layer is produced with a thin film method or with a thick film method.

BRIEF DESCRIPTION OF THE DRAWING

The invention will now be explained in greater detail on the basis of the appended drawing, the sole FIGURE of which shows as follows:

FIG. 1 is a section through a schematic representation of a sensor of the invention.

DETAILED DISCUSSION IN CONJUNCTION WITH THE DRAWING

FIG. 1 shows the essential layer structure of a sensor of the invention. The sensor serves, in such case, for example, for determining and/or monitoring temperature and is, for example, a component of a measuring device. In a further application, the sensor is, for example, applied in a motor, or engine, of a vehicle. Electrical contacting of the sensor for producing, or for tapping, electrical signals, and mechanical securement, etc., are not presented here.

On a substrate 1, which, in an embodiment, contains 99.6% $Al_2O_3$ and small amounts of $SiO_2$, CaO, BaO or MgO, a sensitive (i.e. active for the measuring) layer 2 is applied, e.g. with a thick film method or with a thin film method, such as e.g. with sputtering or vapor deposition. Sensitive layer 2 is, here, for example, an electrical resistor, whose resistance value depends on temperature. Thus, with knowledge of the corresponding, characteristic curve, measurement of electrical resistance permits measurement, or monitoring, of temperature. The sensitive layer 2, for example, essentially of platinum, is applied in a meandering pattern on the substrate 1. The meander is suitably contacted, in order to measure its electrical resistance.

Above the sensitive layer 2 and, in this case, also between the pattern of the sensitive layer 2, and, thus, essentially, on the side of the sensitive layer 2 facing away from the substrate 1, is located a first passivating layer 3. Such a layer has a coefficient of thermal expansion matched to that of the substrate material, so that mechanical stresses, which, for example, occur between the substrate 1 and the sensitive layer 2 due to different coefficients of thermal expansion, are avoided in the presence of high temperatures, or temperature cycles.

According to the invention, the first passivating layer 3 is composed at least partially of the material, of which the substrate 1 is made. Preferably, the percentage thereof lies between 10% and 90%. If the substrate material is, for example, $Al_2O_3$, then also the first passivating layer 3 is between 10% and 90% $Al_2O_3$. In an additional embodiment, the first passivating layer is composed at least partially of a glass and/or a melt of a system, $Al_2O_3$—CaO—SrO or a system, $Al_2O_3$—CaO—BaO.

A method for applying such a passivating layer is a screen printing method. In given cases, it can, consequently, occur, that the method leaves behind "holes" in the passivation. In order to care for this, a second passivating layer 4 is applied on the first passivating layer 3. The second passivating layer 4 is located, thus, on the side of the first passivating layer 3 facing away from the substrate and, respectively, on the side of the first passivating layer 3 facing away from the sensitive layer 2. Such a second layer is not required, when the method for producing the first layer already delivers sufficient results.

In an embodiment, the second passivating layer 4 is composed of the same material as the first passivating layer 3. In additional, alternative or supplementing embodiments, the second passivating layer 4 is composed of a glass system based on $SiO_2$ or CaO or BaO or $Al_2O_3$ or MgO.

Above the second passivating layer 4, there is located, here, a further, protective layer 5. Alternatively, the protective layer 5 is applied directly on the first passivating layer 3, when no second passivating layer 4 is provided or is necessary. The protective layer 5 is embodied in such a manner, that it is water resistant, and, thus, prevents, that water reaches the passivating layer located therebeneath.

The here disclosed passivating of a sensor element prevents, or reduces, mechanical stresses resulting from different coefficients of thermal expansion. Furthermore, it protects against the penetration of water, water vapor or steam. These two functions are, in such case, divided between the passivating layer, or the passivating layers, and the protective layer.

The invention claimed is:

1. A sensor for an apparatus for determining and/or monitoring at least one process variable, comprising:
   at least one substrate, which consists essentially of $Al_2O_3$;
   at least one sensitive layer, which consists essentially of platinum, which is applied on said substrate and which produces at least one measured variable dependent on the process variable and/or a change of the process variable;
   at least one passivating layer, which is applied on said sensitive layer; and
   at least a second passivating layer, which is applied on said at least one passivating layer, wherein:
   said at least one passivating layer contains between about 30% and 50% $Al_2O_3$, and contains between 30% and 50% CaO; and
   said at least one passivating layer and said at least a second passivating layer consists essentially of the same material.

2. The sensor as claimed in claim 1, wherein:
said at least one passivating layer consists essentially of a eutectic glass system.

3. The sensor as claimed in claim 1, wherein:
said at least one passivating layer has a melting temperature lying between about 1200° C. and about 1500° C.

4. The sensor as claimed in claim 1, wherein:
said at least one passivating layer has a melting temperature lying between about 1200° C. and about 1400° C.

5. The sensor as claimed in claim 1, wherein:
said at least one passivating layer comprises a glass and/or a glass system.

6. The sensor as claimed in claim 1, wherein:
said at least one passivating layer comprises alpha-$Al_2O_3$.

7. The sensor as claimed in claim 1, wherein:
said at least one passivating layer comprises a glass and/or a melt of a system, $Al_2O_3$—CaO—BaO.

8. The sensor as claimed in claim 1, wherein:
said at least one passivating layer contains a higher percentage of $Al_2O_3$ than CaO.

9. The sensor as claimed in claim 1, wherein:
said at least one passivating layer contains about 40% $Al_2O_3$, and about 40% CaO.

10. The sensor as claimed in claim 1, wherein:
said at least a second passivating layer consists essentially of a glass system.

11. The sensor as claimed in claim 10, wherein:
the glass system of said at least a second passivating layer is based on $SiO_2$, CaO, BaO, $Al_2O_3$ or MgO.

12. The sensor as claimed in claim 1, further comprising:
at least one protective layer, which is applied on said at least one passivating layer and/or on said at least a second passivating layer.

13. The sensor as claimed in claim 12, wherein:
said at least one protective layer is embodied in such a manner, that it is water resistant and/or water vapor or steam resistant.

14. The sensor as claimed in claim 12, wherein:
said at least one protective layer consists of a glass and/or a glass system based on $SiO_2$, CaO, BaO, $Al_2O_3$ or MgO.

15. The sensor as claimed in claim 1, wherein:
the process variable is temperature.

16. The sensor as claimed in claim 1, wherein:
said at least one sensitive layer is produced with one of: a thin film method and with a thick film method.

* * * * *